US011543798B2

(12) United States Patent
Denenberg et al.

(10) Patent No.: US 11,543,798 B2
(45) Date of Patent: Jan. 3, 2023

(54) SYSTEM ARCHITECTURE FOR SAFETY APPLICATIONS

(71) Applicant: VEO ROBOTICS, INC., Waltham, MA (US)

(72) Inventors: Scott Denenberg, Newton, MA (US); Clara Vu, Cambridge, MA (US); Patrick Sobalvarro, Harvard, MA (US); Lev Persits, Cambridge, MA (US); Ilya A. Kriveshko, Boxborough, MA (US); Elliot Simon, Arlington, MA (US); Alberto Moel, Cambridge, MA (US); Patrick J. Foy, Reading, MA (US); Justin Bronder, Littleton, MA (US)

(73) Assignee: VEO ROBOTICS, INC., Waltham, MA (US)

( * ) Notice: Subject to any disclaimer, the term of this patent is extended or adjusted under 35 U.S.C. 154(b) by 544 days.

(21) Appl. No.: 16/800,429

(22) Filed: Feb. 25, 2020

(65) Prior Publication Data
US 2020/0272123 A1 Aug. 27, 2020

Related U.S. Application Data

(60) Provisional application No. 62/811,070, filed on Feb. 27, 2019.

(51) Int. Cl.
*G06F 17/00* (2019.01)
*G05B 19/4061* (2006.01)
(Continued)

(52) U.S. Cl.
CPC ........ *G05B 19/4061* (2013.01); *B25J 9/1676* (2013.01); *G06T 17/00* (2013.01);
(Continued)

(58) Field of Classification Search
CPC ...... G05B 19/4061; G05B 2219/40339; G05B 2219/50193; G05B 2219/39097;
(Continued)

(56) References Cited

U.S. PATENT DOCUMENTS 9,452,531 B2 9/2016 Kikkeri et al.
10,445,944 B2 10/2019 Galera et al.
(Continued)

FOREIGN PATENT DOCUMENTS

JP 11-65603 A 3/1999
JP 2022522152 A * 4/2022
(Continued)

OTHER PUBLICATIONS

International Search Report and the Written Opinion of the International Searching Authority, for International Application No. PCT/US2020/019659, dated Jun. 17, 2020, 11 pages.
(Continued)

*Primary Examiner* — Ronnie M Mancho
(74) *Attorney, Agent, or Firm* — Morgan, Lewis & Bockius LLP

(57) ABSTRACT

Control systems for industrial machinery (e.g., robots) or other devices such as medical devices utilize a safety processor (SP) designed for integration into safety applications and computational components that are not necessarily safety-rated. The SP monitors performance of the non-safety computational components, including latency checks and verification of identical outputs. One or more sensors send data to the non-safety computational components for sophisticated processing and analysis that the SP cannot not perform, but the results of this processing are sent to the SP, which then generates safety-rated signals to the machinery or device being controlled by the SP. As a result, the system may qualify for a safety rating despite the ability to perform complex operations beyond the scope of safety-rated components.

26 Claims, 5 Drawing Sheets

(51) Int. Cl.
*B25J 9/16* (2006.01)
*G06T 17/00* (2006.01)

(52) U.S. Cl.
CPC .............. *G05B 2219/40339* (2013.01); *G05B 2219/50193* (2013.01)

(58) Field of Classification Search
CPC .......... G05B 2219/39098; B25J 9/1676; B25J 9/1697; B25J 9/1674; G06T 17/00
USPC .......................................................... 700/81
See application file for complete search history.

(56) References Cited

U.S. PATENT DOCUMENTS

| | | | |
|---|---|---|---|
| 11,314,235 B2 * | 4/2022 | Fisher | H04L 67/12 |
| 2012/0291036 A1 | 11/2012 | Taira et al. | |
| 2016/0354927 A1 | 9/2016 | Kikkeri et al. | |
| 2017/0302905 A1 | 10/2017 | Shteinfeld et al. | |
| 2018/0336402 A1 | 11/2018 | Takahashi et al. | |
| 2019/0262991 A1 | 8/2019 | Sugiyama et al. | |
| 2019/0262993 A1 | 8/2019 | Cole et al. | |
| 2020/0017114 A1 * | 1/2020 | Santoni | G06F 11/2028 |
| 2020/0164516 A1 | 5/2020 | Lehment et al. | |
| 2020/0272123 A1 * | 8/2020 | Denenberg | G06T 17/00 |
| 2020/0331146 A1 * | 10/2020 | Vu | G06V 10/764 |

FOREIGN PATENT DOCUMENTS

| | | | |
|---|---|---|---|
| WO | 2009155993 A1 | 12/2009 | |
| WO | WO-2020176473 A1 * | 9/2020 | B25J 9/1674 |

OTHER PUBLICATIONS

Japanese Office Action, Japan Application No. 2021-549788, dated Oct. 14, 2022, 8 pages.

* cited by examiner

SYSTEM ARCHITECTURE FOR SAFETY APPLICATIONS

CROSS-REFERENCE TO RELATED APPLICATION

This application claims priority to and the benefit of, and incorporates herein by reference in its entirety, U.S. Provisional Patent Application No. 62/811,070, filed on Feb. 27, 2019.

FIELD OF THE INVENTION

The field of the invention relates, generally, to monitoring of industrial environments where humans and machinery interact or come into proximity, and in particular to systems and methods for detecting unsafe conditions in a monitored workspace.

BACKGROUND

Industrial machinery is often dangerous to humans. Some machinery is dangerous unless it is completely shut down, while other machinery may have a variety of operating states, some of which are hazardous and some of which are not. In many cases, the degree of hazard depends on the location of the human with respect to the machinery. As a result, many "guarding" approaches have been developed to separate humans and machines and to prevent machinery from causing harm to humans.

One very simple and common type of guarding is a cage that surrounds the machinery, configured such that opening the door of the cage causes an electrical circuit to place the machinery in a safe state. The door may be located so that humans cannot reach the machine before it shuts down. Of course, this prevents all interaction between human and machine, or a human and the workplace the machine is processing, and severely constrains use of the workspace. Another simple guarding mechanism is a pressure-sensitive mat placed a distance from the dangerous machinery; stepping on the mat triggers a safe shutdown of the machinery.

More sophisticated types of guarding may involve, for example, optical sensors such as light curtains, which determine if any object has intruded into a monitored region; area scanners that detect intrusions optically; and 2D LIDAR sensors that use active optical sensing to detect the minimum distance to an obstacle along a series of rays emanating from the sensor. More recently, systems have begun to employ 3D depth information using, for example, 3D time-of-flight sensors, 3D LIDAR, 3D radar, and stereo vision cameras. These sensors offer the ability to detect and locate intrusions into the area surrounding industrial machinery in 3D and offer greater flexibility and power in identifying and tracking objects in workcells.

In industrial automation, the systems intended to ensure the safety of humans working in the surrounding environment of an industrial process are known as "safety systems." These safety systems incorporate a closed control loop together with the electronics and hardware associated with the light curtains, switches on cage doors, emergency stop buttons, and other machine control inputs used as safety interlocks. For example, when a light curtain is triggered, it issues a breach signal to a safety controller. The safety controller thereupon issues a signal to the equipment being guarded by the light curtain to shut down in a safe manner. The safety controller may include a "safety processor," i.e., a microprocessor, microcontroller, or other processor designed for integration into safety systems.

Safety systems usually include a set of redundant circuits separate and isolated from the industrial control system responsible for the associated industrial process. An alternative approach is to use a control device with an integrated safety system, in which case the controller carries out both standard and safety tasks—thereby rendering it unsuitable (for reasons discussed below) in particularly hazardous environments where a high safety rating is required. Additionally, it is expensive and difficult to develop software for integrated safety systems whose software controls both standard and safety tasks in a way that meets the stringent safety standards.

In their simplest implementation, safety systems are hard-wired from switches and relays, including specialized safety relays that compare redundant signals and provide internal checking of machine and safety-system states. A "safety relay" has two mechanically-linked nodes, one which is normally open and one which is normally closed, and when the relay is toggled, the equipment is enabled. In safety-rated systems, two such safety relays are typically used for every safety output in a dual configuration but the feedback input is single-channel, providing redundant checking of the output safe state. More sophisticated systems employ "safety controllers," which receive signals from the safety interlocks (such as a light curtain), process the incoming signal, and issue a signal to the equipment to slow down or stop in a safe manner. Safety control can be implemented in various ways, depending on the required control and safety complexity, and can be passive or active.

Passive safety control is executed using a safety relay, and active safety control is executed using a safety controller. A safety controller can be a programmable logic controller ("safety PLC") module or modules that fulfill the criteria necessary to qualify for a safety rating or can be implemented as a more complex special-purpose industrial computer. Under the direction of a stored safety control program, a safety controller computer examines a series of inputs reflecting the status of the controlled processes and generates a series of safety outputs. A safety controller has as its core a safety processor that receives the inputs from the safety controller and determines a safe output to the machinery being controlled.

The inputs and outputs of the safety controller may be binary (on or off), or analog, in a continuous range. The inputs may be obtained from light curtains or other sensors attached to the industrial process equipment and the outputs may be signals to power control relays, actuators or motors on the equipment. The inputs and outputs can also originate with safety input-output (I/O) modules, which connect directly to the input sensors and the output actuators and are used as common interfaces to the safety controller. The safety I/O modules also provide monitoring functions and the ability to better troubleshoot the safety control system during installation and operation.

For the entire safety system to qualify for a safety rating, all of the elements of the safety system control loop (input sensors, output actuators, safety processor, and interconnects) must generally satisfy the rating criteria, and the interconnection of the different elements and their operation must also comply with industry safety standards. Because human safety is at stake, these standards are stringent, and may specify failure rates for hardware components and rigorous development practices for both hardware and software components.

Standards-compliant systems ensure that dangerous conditions can be detected with very high probability, that failures of the system itself are detected, and that the system will respond to detected failures by transitioning the controlled equipment to a safe state.

For example, the International Standards Organization (ISO) developed the ISO 13849 standard, Safety of Machinery: Safety-Related Parts of Control Systems. ISO 13849 provides safety requirements and guidance for the design of safety-related components. ISO 13849 provides guidelines on the probability of failure of components and circuitry as measured by a performance level (PL). The PL, defined as the average probability of a dangerous failure of the component per hour, ranges from a (lowest) to e (highest).

Similarly, the International Electrotechnical Commission (IEC) developed the general IEC 61508 (Functional Safety of Electrical/Electronic/Programmable Electronic Safety-Related Systems) and machinery-specific IEC 62061 (Safety of Machinery: Functional Safety of Electrical, Electronic and Programmable Electronic Control Systems) standards. IEC 61508 and IEC 62061 specify four safety integrity levels (SILs) of performance for a safety function. Safety systems with a SIL of 2 (SIL 2) and 3 (SIL 3) generally require hardware redundancy for sensors, computational elements, and power supplies, and a safety overlay that transitions the system to a failsafe state in the case of a safety fault. This increases cost, and in addition to being more expensive, safety-rated hardware tends to lag significantly in functionality and performance behind similar, non-safety systems.

A critical variable in a safety system is the "safety response time," which is the amount of elapsed time between a safety-related event (e.g., an intrusion breaching a light curtain) and when the equipment being monitored by the safety system has reached a safe state. This safety response time is a function of a number of variables and depends on the safety system architecture and configuration. For example, in the simple case of a light curtain intrusion triggering the stopping of a robot, it would be the sum of the time it takes the light curtain to issue a signal to the safety controller following a detected breach plus the time it takes for the signal to reach the safety processor (data transmission latency) plus the time it takes for the safety processor to issue a command (safety processor processing time) to the robot plus the time it takes for the signal to travel to the robot emergency stop circuitry plus the time it takes the robot to acknowledge the signal plus the time it takes the robot to stop from its moving state to a safe stopped state.

Each of these times depends on the interconnects and logic instructions within a specific safety program. The reaction time of a controller is the worst-case delay from any input change presented to the controller until the processed output is acknowledged and used to activate a safe state by the machinery being controlled. A properly designed safety system will have a timer to limit the safety task reaction time within an acceptable bound. Exceeding this time bound will cause the timer to transition the safety system output to a safe state.

It is desirable to have the safety response time to be as fast as possible, which allows the safety components such as light curtains to be placed close to the machinery. This is particularly helpful when space on the factory floor is at a premium and there is a need to put the guarding equipment as close to the machines as possible. Also, by minimizing this safety response time, it is more likely that the system will respond to situations where the intrusion itself is moving at high speed (e.g., a human tripping into a dangerous workcell); placing the machinery into a safe state as quickly as possible reduces the possibility of injury.

It is also important for this safety reaction time not to vary between operating cycles, or for it to drift as the system operates. The safety system needs to have a repeatable and reliable safety reaction time. This is critical because the locations where the guarding equipment may be installed depend on an experimentally determined or calculated safety reaction time.

Variations or drifts in this safety reaction time once the guarding equipment is installed and the system is in operation could lead to violations of the minimum distance between guarding and equipment required by safety-rating criteria. As sensing and computation equipment becomes more sophisticated and complex, it becomes progressively more difficult for such equipment to fulfill demanding safety-rating criteria. For example, 3D sensor systems offer the possibility of improved granularity in guarding systems. But 3D sensor systems are more complicated relative to 2D sensor systems, not to mention simple intrusion-detection mechanisms such as light curtains or pressure mats. First, specific safety zones must be identified, taking into account the hazards posed by the machinery, the motion and trajectory of the machinery, the possible actions of humans in the workspace, the workspace layout, and the location and field of view of each individual sensor. It can be difficult to calculate the optimal shapes of exclusion zones, especially when trying to preserve safety while optimizing floor space and system throughput, where one object may present an occlusion relative to a sensor, and where some objects may be out of range or undetectable by the sensor. Moreover, the computation times needed for 3D calculations are longer, and variations in computation time dependent on the possibly changing geometry or complexity of the workspace mean that the safety response time of a system using 3D sensors and computation elements is both longer and more variable than that of a simpler safety system using, for example, a light curtain.

At an extreme, the processing time involved in the detection and classification of elements within the scene is not only long but can also vary by measurement cycle as the environment changes. For example, in the case of a 3D sensing safety system, the more obstructions or occlusions there are in the cell, or the more cameras that are installed, the longer the computation time will be, and this may scale with the complexity of the observed scene. As obstructions are dynamic and can change over time (for example, as a varying number of humans or objects enter and exit the workcell under observation), computation time will vary over time. Consequently, it is not possible to meet safety criteria that require an upper bound on reaction time and/or a limit on reaction time variance.

In sum, in industrial safety, including applications involving robotics, good practice or formal safety regulations require all components of the safety system to be safety-rated. Unfortunately, traditional safety processors cannot perform all the necessary computing tasks involved in safety monitoring of the workcell. Frequently, safety processors lack the processing power to apply the necessary algorithms with sufficient throughput to avoid compromising safety requirements. Accordingly, there is a need for safety architectures that can comply with stringent safety-rating criteria while performing complex operations and accommodating heterogeneous, dynamic environments with unpredictable numbers of people and hazards.

SUMMARY

Embodiments of the present invention utilize a safety processor (SP) and a non-safety multi-processor computation module (MPCM) (i.e., a computation module that includes more than one motherboard). A "non-safety" component means one that was not designed for integration into safety systems (e.g., in accordance with a safety standard). For example, the architecture may be a server-class computing platform using off-the-shelf multi-core CPUs and algorithms with indeterminate runtime yet which is safe for industrial applications. (As used herein, the term "CPU" or "processor" generally refers to a microprocessor, but in various embodiments it may be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), PLD (programmable logic device), PLA (programmable logic array), RFID processor, graphics processing unit (GPU), smart chip, or any other device or arrangement of devices that is capable of implementing the processes of the invention.) The SP monitors performance of the MPCM, including latency checks and verification of identical outputs. One or more sensors send data to the MPCM for sophisticated processing and analysis that the SP cannot not perform, but the results of this processing are sent to the SP, which then generates safety-rated signals to the machinery being controlled by the architecture. As a result, the system may qualify for a safety rating despite the ability to perform complex operations beyond the scope of safety-rated components. Moreover, the use of a system capable of monitoring elapsed time and capable of placing the system in a safe state with sufficient reliability to meet safety requirements allows for the use of algorithms with non-deterministic or varying run times, which would otherwise be ineligible for inclusion in a safety system. For illustrative purposes, the ensuing discussion focuses on a computation module with two (dual) processor board (DPCM) implementation, but it should be understood that architectures with more than two processor computation modules are within the scope of the invention.

In various embodiments, the SP, which may be an off-the-shelf safety processor, is responsible for both safety-rated and non-safety-rated communication with the machinery, monitoring the overall health of the system, and detecting processing latency's that compromise the safety guarantees of the system. In an alternative embodiment, the SP is responsible for safety-rated communications and the MPCM for non-safety-rated communications.

Accordingly, in a first, aspect, the invention pertains to control system comprising, in various embodiments, a plurality of sensors configured to produce sensor outputs; a plurality of non-safety computation modules, the non-safety computation modules each including a processor and being simultaneously responsive to the sensor outputs and executing a safety analysis, the non-safety computation modules producing control signals in response to detection of a safety condition by the safety analysis; and a safety processor configured to receive the control signals from the computation module and generate therefrom safety-rated signals for controlling the industrial machinery.

In some embodiments, the safety processor is further configured to monitor performance of the computation modules including latency checks and verification of identical outputs. The safety processor may be further configured to monitor intermediate results or data structures and error-correcting codes thereof, and may include execution of an algorithm with non-deterministic or varying run times. The sensors may be, for example, 3D time-of-flight cameras, and in various embodiments, the computation modules are configured to perform image capture from time-of-flight camera data, identification, and classification at in real time with low latency.

In some embodiments, the computation modules are configured to analyze occupancy and occlusion of a monitored space by registering the sensors with respect to each other so that the images obtained by the sensors collectively represent the workspace; generating a three-dimensional representation of the workspace as a plurality of volumes; for each sensor pixel having an intensity level above a threshold value, preliminarily marking as unoccupied volumes intercepted by a line-of-sight ray path through the pixel and terminating at an estimated distance from the associated sensor of an occlusion, marking as occupied the volumes corresponding to a terminus of the ray path, and marking as unknown any volumes beyond the occlusion along the ray path; for each sensor pixel having an intensity level below the threshold value, preliminarily marking as unknown all voxels intercepted by a line-of-sight ray path through the pixel and terminating at a boundary of the workspace; and finally marking as unoccupied volumes that have been preliminarily marked at least once as unoccupied.

The computation modules may be configured to evaluate safety conditions in a monitored space by registering the sensors with respect to each other so that the images obtained by the sensors collectively represent the workspace; generating a three-dimensional representation of the workspace as a plurality of volumes; and generating a volumetric representation of all points reachable by movable machinery in the workspace within a specified time period.

In some embodiments, the industrial machinery is at least one robot. The plurality of computation modules may be, for example, two dual-processor computation modules. The plurality of computation modules may be configured to generate a 3D representation of a workcell monitored by the sensors. The safety analysis may comprise speed and separation monitoring in accordance with at least one of ISO/TS 15066 or ISO 10218-2 and/or protective separation distance monitoring in accordance with at least one of ISO/TS 15066 or ISO 10218-2.

The computation modules may be configured to sequentially trigger operation of the sensors so as to prevent crosstalk thereamong and/or to receive latency tags issued by the safety processor. The safety processor may be configured to generate and transmit latency tags to the sensors for return to the computation modules with sensor outputs; to receive and analyze latency tags returned by the computation modules to determine whether a duration associated with processing by the plurality of computation modules exceeds a predetermined maximum interval; to receive and analyze intermediate values returned by the computation modules to determine whether a processing error by the plurality of computation modules has occurred; to verify that the plurality of computation modules operate substantially simultaneously in accordance with a latency criterion; to verify that commands issued substantially simultaneously by the plurality of computation modules agree with each other; to cause execution by the controlled industrial machinery of commands issued substantially simultaneously by the plurality of computation modules following verification that (*a*) the plurality of computation modules operate substantially simultaneously in accordance with a latency criterion and (*b*) the commands issued substantially simultaneously by the plurality of computation modules agree with each other; and/or to verify that clock and timing signals are consistent with independent redundant reference signals.

In some embodiments, the computation modules perform identical computations, whereas in other embodiments, the computation modules perform different computations. In some embodiments, the computation modules are identical, whereas in other embodiments, the computation modules are different in terms of at least one of a processor, an architecture or an operating system.

In general, as used herein, the term "substantially" means±10%, and in some embodiments, ±5%. In addition, reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Systems in accordance herewith combine an SP and one or more MCPMs in an architecture that can perform computations beyond the capabilities of conventional processors designed for use in safety applications yet meet regulatory requirements for use in safety applications. An application of architectures in accordance herewith is a 3D vision safety system used to monitor an industrial workcell in order to allow for safe collaboration between humans and industrial machinery, including robots. It should be understood, however, that this application represents just one example of the uses to which the present invention is suited; more broadly, the approach of the invention is applicable generally to deployments requiring a high-performance, low-latency computation engine to process signals (e.g., sensor signals) in a safety system.

Figure 1:
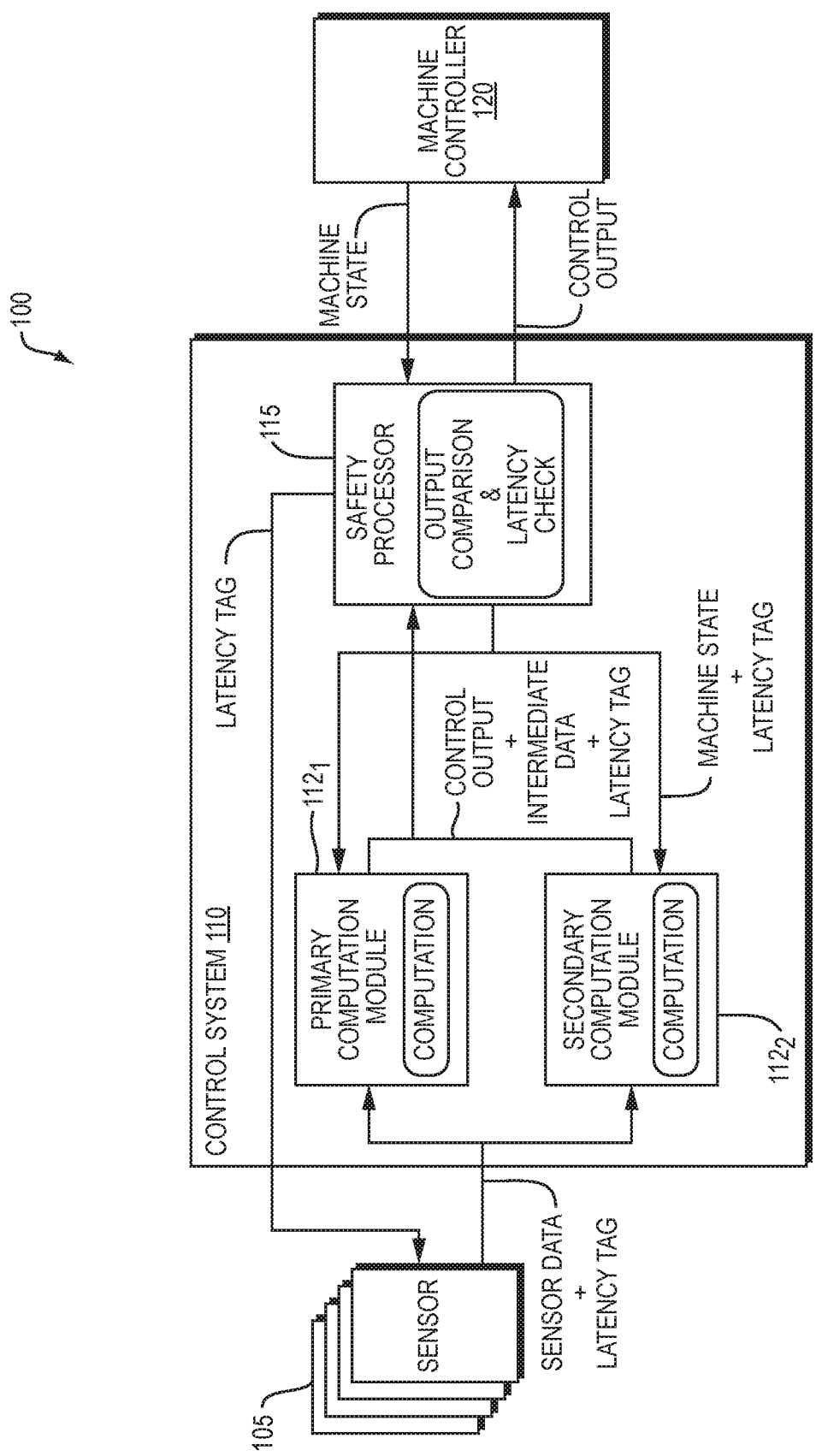
FIG. 1 schematically illustrates a safety system implementing a dual processor architecture in accordance with an embodiment of the invention.

A representative system is illustrated in FIG. 1. The system 100 includes two main subsystems: one or more sensors 105, e.g., 3D time-of-flight (ToF) sensors, and the control system 110 described in greater detail below and sometimes referred to as the "safety architecture." The safety architecture 110 includes a primary computation module $112_1$ and a secondary computation module $112_2$, both of which may be DPCMs capable of performing computationally intensive algorithms and data processing with low latency (using, e.g., a GPU) and a single safety processor (SP) 115 designed for use in real-time safety applications. Each of the computation modules 112 may be, for example, a server-class motherboard including one or more Xeon processors, e.g., one of the Server Board S2600BP family of motherboards marketed by Intel Corp. The computation modules 112 may be identical or different, i.e., having different processors and/or architectures, originating with different manufacturers, and possibly with different operating systems.

The architecture provides the benefit of high-performance processing while maintaining the fault tolerance and the guaranteed latency required by many safety systems.

The sensors 105 transmit, by wired or wireless means, sensor data (e.g., images) to the computation modules 112, which process them to determine appropriate control outputs. In addition, the sensors 105 send latency tags—described in greater detail below in connection with FIG. 5—to the computation modules 112, which forward these to the SP 115.

Each computation module 112 performs a safety analysis and sends computed control output signals to SP 115. By "safety analysis" is meant analysis of sensor output so as to detect or predict conditions that may lead to altering the operation of, or stopping, the controlled system. In addition, computation modules 112 may send intermediate data or error-detecting codes such as cyclic redundancy checks (CRCs) of intermediate data structures to be compared to the control outputs. This is helpful because the calculations performed by computation modules 112 may involve complex algorithms applied to large data structures, some of which maintain state that is built up over time, but the control output can be as simple as a percentage speed override or even a boolean value indicating whether or not the machinery can be allowed to continue operating. Since a wide variety of calculations can produce the same output, comparing intermediate results can provide higher confidence that no faults occurred, and that current system state is correct.

SP 115 supplies control output signals to the controller 120 of the system (e.g., industrial machinery, a robot, medical equipment, etc.) being controlled and receives system state information from controller 120. Thus, control output signals come directly from SP 115 rather than computation modules 112, even though the computation modules perform the most intensive operations, and as a result, system 100 may meet regulatory requirements for use in safety applications with computational capabilities beyond those provided by conventional safety processors.

Figure 2:
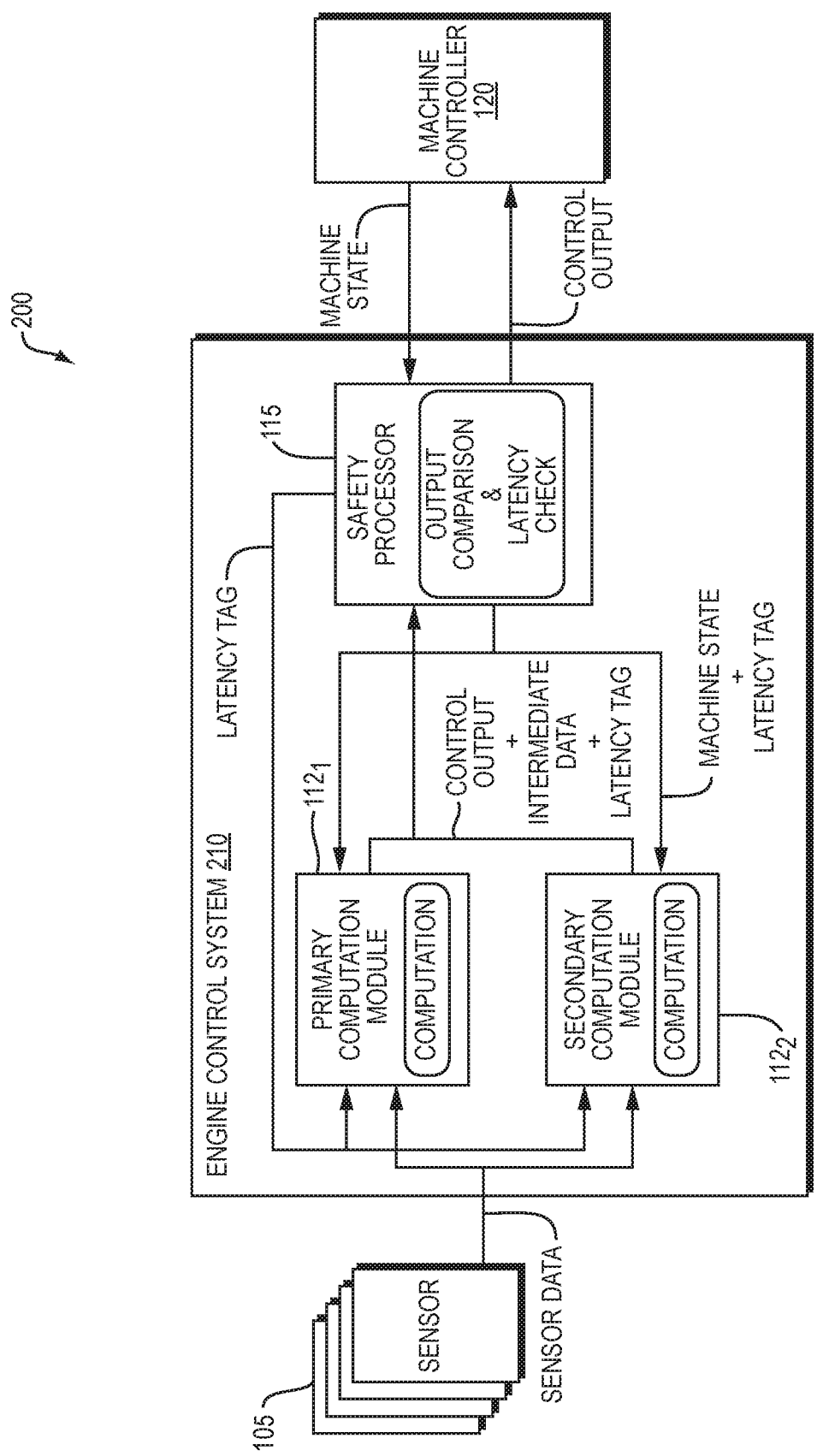
FIG. 2 schematically illustrates a safety system implementing a dual processor architecture in accordance with another embodiment of the invention.

As shown in FIG. 2, in some embodiments 200, the sensors 105 may provide their own latency guarantees via an alternate mechanism and not pass latency tags to the computation modules 112. In this case, the SP 115 can pass latency tags directly to the computation modules 112, and the safety architecture 210 only monitors the latency of the calculations performed on the computation modules rather than the full end-to-end latency of the system (including any processing latency within the sensors themselves). The SP 115 transmits latency tags to the computation modules 112 rather than to the sensors 105.

Figure 3:
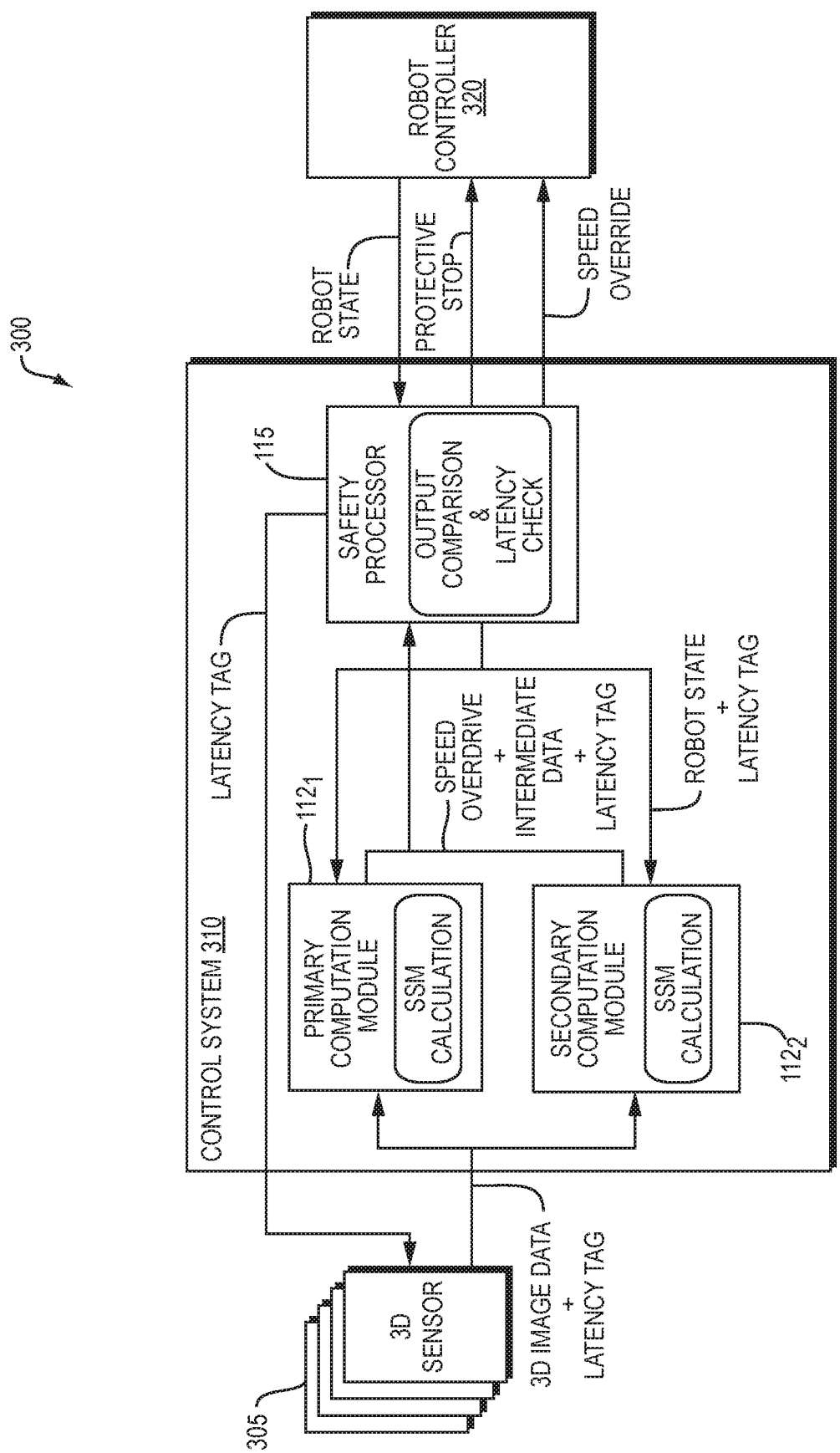
FIG. 3 schematically illustrates a safety system implementing a dual processor architecture in accordance with an embodiment of the invention for performing Speed and Separation Monitoring in industrial workcells.
Figure 4:
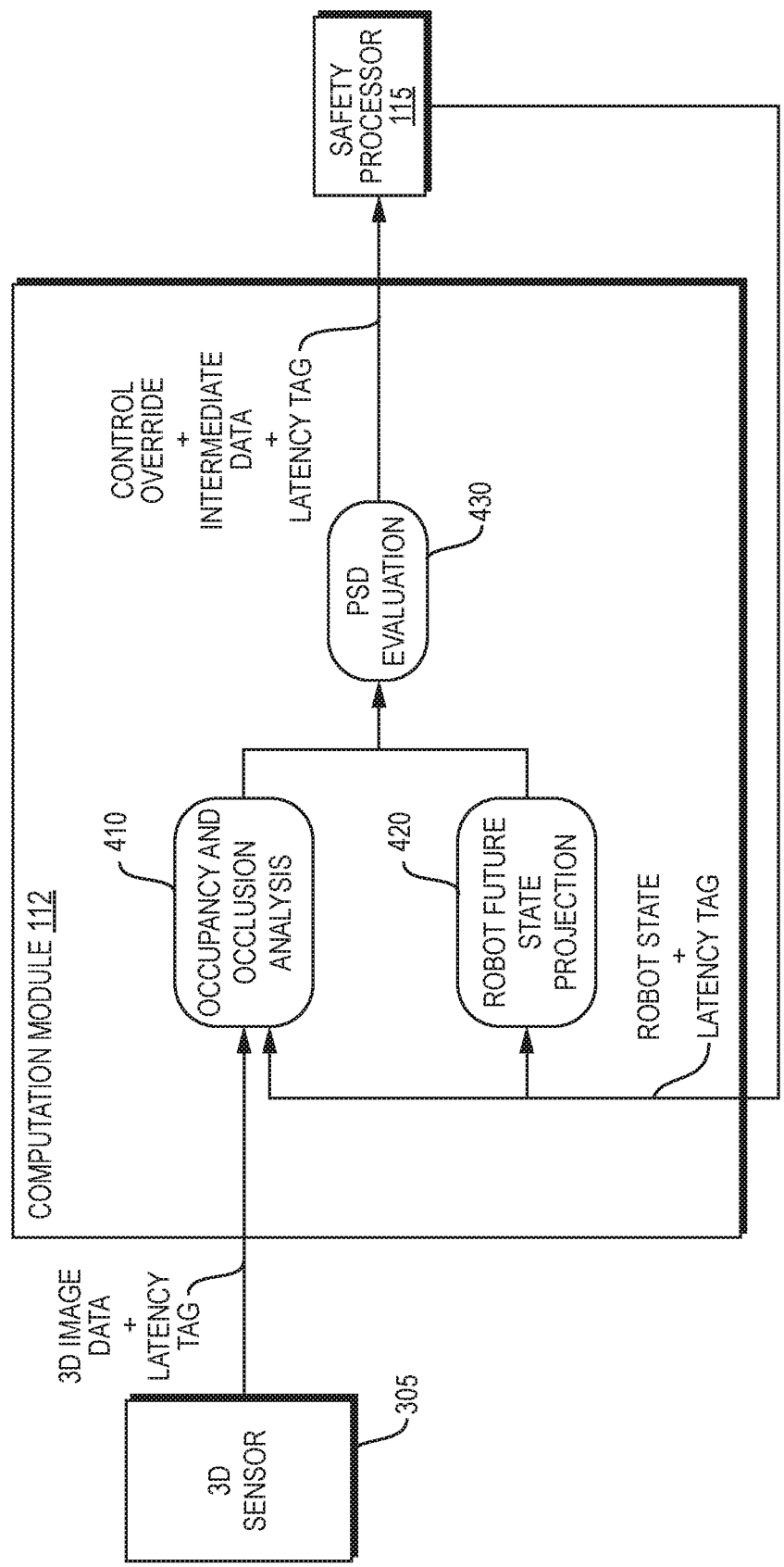
FIG. 4 schematically illustrates functions performed by a DCPM and its communication with the SP in accordance with an embodiment of the invention for performing Speed and Separation Monitoring in industrial workcells.

As shown in FIG. 3, this architecture can be used to implement a 3D vision safety system 300 that will slow or stop any hazards as a person approaches the controlled machinery (a robot in the illustrated embodiment) and will restart the machinery automatically once the person has cleared the area. This type of safeguarding is known as Speed and Separation Monitoring (SSM) and is defined in ISO 10218-2 and ISO/TS 15066. In this case, the sensors 305 may be 3D time-of-flight (ToF) sensors. There may be multiple (e.g., up to eight) ToF sensors 305 in a typical deployment. Each sensor 305 is responsible for providing a depth image from its own perspective, and the computation modules 112 process all of the depth images to generate and/or analyze the 3D volume. Suitable ToF sensors are described in U.S. Ser. No. 16/553,724, filed on Aug. 28, 2019 and incorporated herein by reference. At 30 frames/sec, the SP 115 continuously triggers the 3D sensors 105 (typically in a sequential fashion so as to prevent crosstalk among the sensors). The sensor data is transmitted to the computation modules 112 for processing and generation, as necessary based on the analyzed sensor data, of speed override commands that are passed to the SP 115. The SP 115 also communicates with the robot controller 320 and provides robot state data, tagged with latency tags to the computation modules 112. In this embodiment, as shown in FIG. 4 the computation modules 112 each include modules that collectively transform data from all sensors 105 into a coherent 3D representation of the monitored workcell. In the illustrated embodiment, these modules include an occupancy and occlusion analysis module 410, which analyzes the 3D volume of voxels representing the monitored workcell to identify objects and occluded regions (in accordance, for example, with U.S. Pat. No. 10,099,372, the entire disclosure of which is hereby incorporated by reference). The computation module 112 also includes a robot future state projection module 420, which, as also described in the '372 patent, predicts a future robot state based on the current state (positions and velocities) and the robot's kinematics; and a module 430 for computing Protective Separation Distances (PSDs) (as defined in ISO/TS 15066) between objects in the workcell and the future robot state predicted by the module 420. As described in U.S. Ser. No. 62/890,718, filed on Aug. 23, 2019 (the entire contents of which are hereby incorporated by reference), the future robot state may be a voxel (or other) representation of all points reachable by the robot within a specified time period. In this embodiment, the control outputs generated by the SP 115 are safety signals that override the task-performance commands issued by the conventionally programmed robot controller 320 in the course of normal robot operation. The SP 115 signals this information to the robot controller 320 via, for example, relays and output signal-switching devices (OSSDs), which issue "stop" commands to prevent hazardous movements. OSSDs are conventional components that stop or interrupt machinery when entry or proximity is a hazard. The control outputs could also include alternative trajectories designed to avoid collisions. The SP 115 may also communicate with the robot controller 320 over, for example, an ethernet interface to obtain robot state information, which it passes to the computation modules 112 for use in the PSD calculations. Accordingly, in various embodiments, the SP 115 is the "single source of truth" and sole arbiter of the safety control architecture 100.

Figure 5:
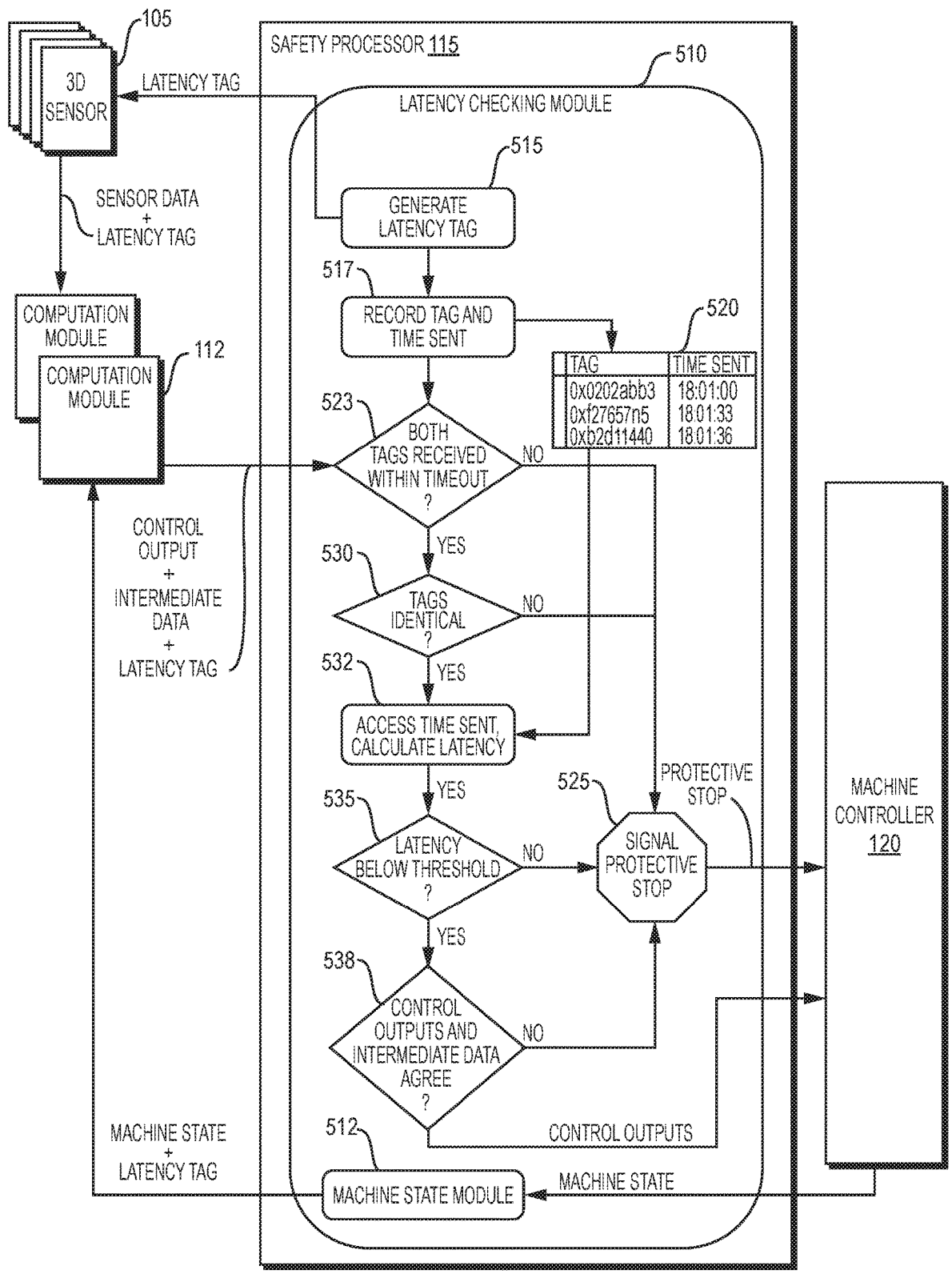
FIG. 5 schematically illustrates the latency monitoring function and DCPM output comparison performed by the SP in accordance with an embodiment of the invention.

An important function performed by the SP 115 is checking latency within the system to ensure it remains within acceptable bounds; excessive latency can indicate an unsafe condition. As shown in FIG. 5, the SP 115 may include a latency-checking module 510 that first ends a latency tag—e.g., a random 32-bit number—to the sensors 105, triggering them to capture a frame of data (step 515). The SP 115 may also passively or actively gather machine state information and maintain it in a module 512 or memory partition. This information may accompany the latency tag when it is sent to the computation modules 112 in order to enable the computation modules to temporally correlate machine state with sensor data.

The computation modules 112 then perform, in parallel, the calculations required to determine the control outputs to be sent to the machinery under control. As each computation module 112 performs these calculations, the latency tag is carried alongside the intermediate results derived from that data. Both computation modules 112 transmit the results of their computations to the SP 115, along with the latency tag that accompanied the data used in those computations, over an appropriate protocol (e.g., a Black Channel protocol). Meanwhile, in step 517, the latency checking module 510 records the generated latency tag in a lookup table 520 that stores each unique tag with its timestamp, i.e., the time it was sent to the sensors 105. The latency checking module 510 monitors the time elapsed since the latency tag was sent to the sensors 105 to determine whether too much time passes between transmission and receipt of the latency tag (step 523). In normal operation, the SP 115 will receive the latency tag, along with control output signals and any intermediate data, from the computation modules 112 within a fixed timeout period consistent with normal operation. If the interval between transmission and receipt, or the absolute time elapsed since transmission if the latency tag never returns to the SP 115, exceeds the timeout period, a protective stop is asserted (step 525) to the machine controller 120.

If, however, both computation modules 112 provide control outputs and latency tags within the timeout period, the latency checking module 510 compares both the latency tags and the outputs themselves from the two computation modules 112. If the latency tags are identical (step 530), and were issued by the SP 115 within the timeout period (steps 532, 535), and the control outputs and intermediate data agree (step 538), then the latency checking module 510 forwards the control outputs to the machine controller 120. If, however, one or both latency tags are incorrect, or were issued outside the timeout period, or if the control outputs or intermediate data do not agree, the latency checking module 510 acts on its own to place the machinery in a safe state (step 525).

By monitoring the latency tags, the SP 115 thus ensures that variability in performance of unbounded operations on the computation modules 112 cannot result in an unsafe state of the system. Similarly, by ensuring that the control outputs and intermediate data generated by the computation modules 112 agree, a single hardware fault or random software fault on either of the computation modules cannot result in an unsafe state of the system. It should be noted that multiple latency tags can be in flight at once, if, for example, the total processing time of the computation modules 112 is greater than the time between sensor frames. In this case, the computations on the modules 112 may be pipelined, with some cores performing earlier computations on later frames while other cores perform later computations on earlier frames.

Further, while in some embodiments the computation modules 112 perform identical computations whose final and intermediate outputs can be directly compared, in other embodiments the computation modules 112 perform slightly modified computations that encompass the same safety function, such as by offsetting voxel grids by ½ voxel, or each processing a separate sensor channel; in such implementations, only decisions are compared in step 538. This latter approach provides increased diversity but reduced diagnostic coverage.

The SP 115 may also perform periodic health self-checks including checking the consistency of the clock and timing signals driving the triggering and data collection with independent redundant external clock signals to ensure correct clock functionality of the SP 115; and monitoring of overall health of the system including temperature, humidity and power levels (e.g., via conventional sensors, which are not illustrated). For example, for safety relays there is an external device monitoring (EDM) signal that monitors the safe and proper functioning of a safety relay. This EDM signal is connected to the SP 112 and in case a safety relay is not operating properly, the SP 112 can generate a signal to the machinery or robot controller to stop in a safe manner.

The SP 115 may include hardware elements, such as core undervoltage and overvoltage monitoring, ensuring that if the SP 115 cannot function in a safe state, additional health monitoring occurs such that the SP 115 and the safety-rated outputs can be put in a safe state. This includes but is not limited to a random failure of the SP 115 or any of its computing elements; a power failure; or a failure of an internal check. If the SP 115 or the health-monitoring hardware generates a failure signal, the SP 115 or the health-monitoring hardware can generate additional signals to put the entire safety architecture 100 in a safe state.

All of the modules in the computational modules 112 and the SP 115 may be programmed in any suitable programming language, including, without limitation, high-level languages such as C, C++, C#, Ada, Basic, Cobra, Fortran, Java, Lisp, Perl, Python, Ruby, or low-level assembly languages. The illustrated safety architecture 100 allows each of the computation modules 112 to be replaced with faster hardware or updated software without changing the SP 115 or other portion of the safety system. Furthermore, the illustrated configuration allows the safety architecture 100 to "fail safe," that is, if the latency checking module 510 of the SP 115 detects a computation fault, the SP 115 brings the system to a safe state. If either computation module 112 module suffers a random fault resulting in different outputs, the safety functions provided by the system can no longer be guaranteed (i.e., they do not agree on what the output should be, therefore safety cannot be guaranteed). An alternative embodiment includes three computation modules 112 that allow for a single random failure in one of them. If the remaining two computation modules 112 agree on the results, the SP 115 will not issue a signal to shut the system down (a "fail operational" mode).

Certain embodiments of the present invention are described above. It is, however, expressly noted that the present invention is not limited to those embodiments; rather, additions and modifications to what is expressly described herein are also included within the scope of the invention.

What is claimed is:

1. A control system comprising:
    a plurality of sensors configured to produce sensor outputs;
    a plurality of non-safety computation modules, the non-safety computation modules each including a processor and being simultaneously responsive to the sensor outputs and executing a safety analysis, the non-safety computation modules producing control signals in response to detection of a safety condition by the safety analysis; and
    a safety processor configured to receive the control signals from the computation modules and generate therefrom safety-rated signals for controlling a device.

2. The control system of claim 1, wherein the safety processor is further configured to monitor performance of the computation modules including latency checks and verification of identical outputs.

3. The control system of claim 1, wherein the safety processor is further configured to monitor intermediate results or data structures and error-correcting codes thereof.

4. The control system of claim 1, wherein the safety analysis includes execution of an algorithm with non-deterministic or varying run times.

5. The control system of claim 1, wherein the sensors are 3D time-of-flight cameras.

6. The control system of claim 5, wherein the computation modules are configured to perform image capture from the time-of-flight camera data, identification, and classification in real time with low latency.

7. The control system of claim 5, wherein the computation modules are configured to analyze occupancy and occlusion of a monitored space by:
    registering the sensors with respect to each other so that the images obtained by the sensors collectively represent the workspace;
    generating a three-dimensional representation of the workspace as a plurality of volumes;
    for each sensor pixel having an intensity level above a threshold value, preliminarily marking as unoccupied volumes intercepted by a line-of-sight ray path through the pixel and terminating at an estimated distance from the associated sensor of an occlusion, marking as occupied the volumes corresponding to a terminus of the ray path, and marking as unknown any volumes beyond the occlusion along the ray path;
    for each sensor pixel having an intensity level below the threshold value, preliminarily marking as unknown all voxels intercepted by a line-of-sight ray path through the pixel and terminating at a boundary of the workspace; and
    finally marking as unoccupied volumes that have been preliminarily marked at least once as unoccupied.

8. The control system of claim 5, wherein the computation modules are configured to evaluate safety conditions in a monitored space by:
    registering the sensors with respect to each other so that the images obtained by the sensors collectively represent the workspace;
    generating a three-dimensional representation of the workspace as a plurality of volumes; and
    generating a volumetric representation of all points reachable by movable machinery in the workspace within a specified time period.

9. The control system of claim 1, wherein the device is at least one robot.

10. The control system of claim 1, wherein the plurality of computation modules are two dual-processor computation modules.

11. The control system of claim 1, wherein the plurality of computation modules are configured to generate a 3D representation of a workcell monitored by the sensors.

12. The control system of claim 1, wherein the safety analysis comprises speed and separation monitoring in accordance with at least one of ISO/TS 15066 or ISO 10218-2.

13. The control system of claim 1, wherein the safety analysis comprises protective separation distance monitoring in accordance with at least one of ISO/TS 15066 or ISO 10218-2.

14. The control system of claim 1, wherein the plurality of computation modules are configured to sequentially trigger operation of the sensors so as to prevent crosstalk thereamong.

15. The control system of claim 1, wherein the plurality of computation modules are configured to receive latency tags issued by the safety processor.

16. The control system of claim 1, wherein the safety processor is configured to generate and transmit latency tags to the sensors for return to the computation modules with sensor outputs.

17. The control system of claim 15, wherein the safety processor is configured to receive and analyze latency tags returned by the computation modules to determine whether a duration associated with processing by the plurality of computation modules exceeds a predetermined maximum interval.

18. The control system of claim 1, wherein the safety processor is configured to receive and analyze intermediate values returned by the computation modules to determine whether a processing error by the plurality of computation modules has occurred.

19. The control system of claim 1, wherein the safety processor is configured to verify that the plurality of computation modules operate substantially simultaneously in accordance with a latency criterion.

20. The control system of claim 1, wherein the safety processor is configured to verify that commands issued substantially simultaneously by the plurality of computation modules agree with each other.

21. The control system of claim 20, wherein the computation modules perform identical computations.

22. The control system of claim 20, wherein the computation modules perform different computations.

23. The control system of claim 1, wherein the safety processor is configured to cause execution by the controlled device of commands issued substantially simultaneously by the plurality of computation modules following verification that (a) the plurality of computation modules operate substantially simultaneously in accordance with a latency criterion and (b) the commands issued substantially simultaneously by the plurality of computation modules agree with each other.

24. The control system of claim 1, wherein the safety processor is configured to verify that clock and timing signals are consistent with independent redundant reference signals.

25. The control system of claim 1, wherein the computation modules are identical.

26. The control system of claim 1, wherein the computation modules are different in terms of at least one of a processor, an architecture, or an operating system.

* * * * *